United States Patent [19]

Taylor et al.

[11] 4,117,176
[45] Sep. 26, 1978

[54] FRUIT-FLAVORED CANDY PRODUCT

[75] Inventors: Paul G. Taylor, Pleasant Hill; Chung H. Son; Martha C. Hom, both of Concord; L. G. Williams, Martinez, all of Calif.; Ronald E. Steel, Wentzville, Mo.

[73] Assignee: Del Monte Corporation, San Francisco, Calif.

[21] Appl. No.: 765,302

[22] Filed: Feb. 3, 1977

[51] Int. Cl.² ............................................. A23G 3/00
[52] U.S. Cl. ................................. 426/660; 426/662; 426/578
[58] Field of Search ................ 426/578, 599, 660, 662

[56] References Cited

U.S. PATENT DOCUMENTS

| | | | |
|---|---|---|---|
| 1,928,901 | 10/1933 | Krno | 426/578 |
| 3,265,510 | 8/1966 | Wurzburg | 426/660 |
| 3,692,542 | 9/1972 | Phillips | 426/660 |
| 3,806,617 | 4/1974 | Smylie et al. | 426/578 |

OTHER PUBLICATIONS

Chenoweth, W., How to Make Candy, MacMillan Co., New York, 1936, pp. 115–119.

*Primary Examiner*—Jeanette M. Hunter
*Attorney, Agent, or Firm*—Flehr, Hohbach, Test, Albritton & Herbert

[57] ABSTRACT

A candy product with a fruit flavor having a natural character, a corn syrup-based translucent substrate and opaque dehydrated fruit particles randomly dispersed in the same. The candy product is characterized by a chewy character, a taffy-like consistency, and a slipperiness sufficient to avoid adhering to the teeth.

11 Claims, No Drawings

FRUIT-FLAVORED CANDY PRODUCT

BACKGROUND OF THE INVENTION

There are a number of fruit flavored candy products on the market. Many of these products are based on corn syrup and include sugar and artificial fruit flavoring.

One such product sold under the name "Now & Later" by Phoenix Candy Company, is opaque. It tends to stick to the teeth. Also, the product is not very stretchable. Another product is "Jolly Rancher—Grape Stix" sold by Jolly Rancher Company, a hard non-stretchable candy with a glassy appearance and a brittle nature. Another product is sold under the name "Jolly Rancher—Super Chews" is opaque and has a medicinal flavor. Also, it tends to adhere to the teeth. A further product "Galaxy—Starburst Fruit Chews" sold by Jack Candies, Ltd. tends to adhere to the teeth and does not have desirable flavor. Another related product is "Red Whips" sold by the American Licorice Company is opaque and very tough and hard. Also, it does not have a natural fruit-flavor.

Another product which is more of a health food than a candy is sold under the name "Fruit Roll" in various fruit flavors by Knox Gelatin Inc. This opaque product is characterized by a slow flavor release and low flavor level. It has a leathery not stretchy constituency. It is apparently based on fruit purees or concentrates.

SUMMARY OF THE INVENTION AND OBJECTS

In accordance with the present invention, a candy product is provided with a corn syrup-based translucent substrate and opaque dehydrated fruit particles randomly dispersed throughout the substrate. This product is characterized by a fresh fruit taste, a chewy character, and a stretchability comparable to taffy. It is stable to flow at elevated temperatures. Tapioca dextrin and corn syrup are the preferred ingredients to render the product chewable. The product includes emulsifying agents, vegetable oil, and glycerin in sufficient quantity to render it slippery to avoid adhering to the teeth upon chewing.

It is an object of the invention to provide a fruit-flavored candy product which is translucent and includes opaque dehydrated fruit particles.

It is a further object of the invention to provide a product of the foregoing type with a chewy character and a taffy-like consistency.

It is another object of the invention to provide a product of the above type which does not stick to the teeth upon chewing.

It is a further object of the invention to provide a product of the above type which does not flow at a storage temperature of 85° F.

Further objects and features of the invention will be apparent from the following description of the preferred embodiments.

DETAILED DESCRIPTION OF THE PREFERRED EMBODIMENTS

In accordance with the present invention, a unique candy product has been provided characterized by a translucent substrate, with opaque dehydrated fruit particles such as diced or ground apples distributed throughout the same. The product is further characterized by a fruit taste, a chewy character and a taffy-like consistency.

It should be appreciated that the formation of a candy product of the above type includes many ingredients which provide the desired characteristics in various combinations and sub-combinations with other ingredients. However, the general character of the product can best be described in reference to a suitable general formulation and thereafter enumerating characteristics of the formulation attributable to individual components. It should be understood that this is somewhat of an over-simplification and that equivalents for certain of the ingredients may be substituted without departing from the scope of the invention. A typical generalized formulation is set forth in Table 1 below.

Table 1

| Component | Typical Formulation Percentage Range |
|---|---|
| Corn Syrup | 30 – 60 |
| 6-hydroxy alcohol (sorbitol) | 2 – 10 |
| Glycerin | 0.5 – 3 |
| Fruit Juice Concentrate (apple) | 2 – 10 |
| Dehydrated Fruit (apple) | 2 – 25 |
| Emulsifier (HLB 2.8 – 7.7) | 0.5 – 3 |
| Vegetable Oil (partially hydrogenated) | 1 – 10 |
| Starch | 0 – 6 |
| Wheat Flour | 0 – 6 |
| Binder (tapioca dextrin) | 5 – 20 |
| Sugar (sucrose) | 5 – 20 |
| Food grade organic acid (citric) | 0.2 – 1 |
| Food grade organic acid salt (sodium citrate) | 0 – 0.4 |
| Water (added in mixing step) | 2 – 10 |

The above formulation is based upon corn syrup as the major ingredient (30–60%). It is well recognized that corn syrup contributes characteristics to candies such as sweetness, water binding properties, a chewy and somewhat stretchy character. In the present product, the corn syrup is not crystallized during processing. As an indication of the interrelationship of the products, adding corn syrup in an amount at the lower end of the range would require increasing the sugar content to provide the desired degree of sweetness. Thus, for example, a desired sweetness level is imparted by a product with a corn syrup content of about 52% and a sucrose content of about 8%. Another product of desirable sweetness is formed with a corn syrup content of 38% and a sucrose content of 14%. In the present application all percentages will be percentages by weight of the total candy product unless otherwise designated.

Another factor bearing on the percentage of corn syrup for sweetness is the type of corn syrup employed. For example, regular corn syrup (43° Be, 43 DE) has a lower sweetening capacity than high maltose corn syrup (43° Be, DE 42). Accordingly, the smaller percentage of the high maltose corn syrup may be employed to impart the desired sweetness.

The candy product preferably includes a binder to provide the desired chewy texture. The polysaccharide, tapioca dextrin, imparts an excellent chewy texture to the product when present at 5–20%. Other materials, if available, may be employed such as various hydrocolloids including gum arabic. Addition of binder reduces the texture requirement of the corn syrup. Thus, the presence of say tapioca dextrin can reduce the texture requirement of corn syrup from 52 to 38% in the formulation. As set forth above, this would require a higher proportion of sucrose to maintain the desired sweetness level.

Another desirable ingredient of the formulation is a 6-hydroxy alcohol such as sorbitol or mannitol. For example, sorbitol contributes not only sweetness but a water binding capacity and body. In addition, its presence at 2–20% tends to decrease the tendency of the sugar in the candy product from crystallizing during processing.

Another characteristic of the substrate is that it is translucent. This translucent nature is imparted by the basic ingredients together with conventional natural or artificial coloring which does not render the product opaque. For example, a red color may be imparted by F.D. & C. Red No. 40 in a minor amount of say 0.01% for use on a raspberry or cherry like product. An apple product may employ a tan color while a grape product may use a grape and red color.

A major difference of the present product from the prior art is the inclusion of opaque dehydrated fruit particles which are randomly dispersed throughout the candy substrate. Since the particles are opaque, they are clearly visible in the translucent candy substrate. Suitable fruit particles are derived from dehydrated apple, pear, grape, cherry, strawberry or any fleshy fruit. Dehydrated apple particles diced or ground at 3 mm size have been found to be desirable from a processing and visual standpoint. Since a major portion of the fruit taste is imparted to the product by ingredients other than the fruit pieces, one type of fruit may be employed for different fruit-like products. Thus, the dried apple pieces can be used in a formulation for a strawberry or cherry product by varying the flavor and color of the substrate to approximate that of the desired fruit.

Flavoring agents may be added to the product to impart the desired flavor. For example, a cinnamon-apple product could include natural or artificial cinnamon flavoring. In general, it has been found desirable to include a fruit juice concentrate such as of apple or grape to impart the desired natural fruit flavor, along with additional sweetness, to the product. For example, an apple product may include an apple juice concentrate. Also, a puree such as of strawberry may be added to a strawberry-like product. Although the fruit juice concentrate is highly desirable, it should be understood that artificial flavoring may also be added to the product.

It has been found desirable to impart a tart taste to the product. For this purpose, various food grade organic acids such as citric and malic acid may be added to the product, say, in the proportion indicated in Table 1. Alternatively, the acid may be of a natural form such as the citric acid component of lemon juice. If desired, a food grade organic acid salt may be added as a buffer to control the tartness of the acid which is added. When employing citric acid, sodium citrate is a suitable buffer.

Another important characteristic of the product is that it does not adhere to the teeth during chewing. Various ingredients of Table 1 are believed to serve as lubricants to this to overcome the otherwise adherent nature of the product. It is believed that the combination of emulsifier, glycerin, and vegetable oil provide this slippery character of the product.

The vegetable oil contributes to the desired mouth feel of the product. Also, it provides a natural lubrication for the product during processing on equipment. One type of suitable vegetable oil is a partially hydrogenated vegetable oil (soy bean oil) of high stability and of relatively low molecular weight sold by Durkee Co. under the name "Durkex 500." This oil is a liquid at ambient temperature. Another suitable vegetable oil which is more fully hydrogenated is sold under the name "Kaomel" by Durkee Co. and is of higher molecular weight and in a solid granular or flake form at ambient temperature.

The ingredient glycerin contributes to the water binding properties and chewy texture of the product in addition to the lubricating property set forth above. The glycerin also serves as a plasticizer and humectant. Also, it tends to inhibit graining or large sugar crystal growth in the product.

The emulsifier is an important ingredient contributing to the lubricated character of the product and to prevent separation of the vegetable oil during processing, and to aid in reducing the tendency to stick to the teeth.

Emulsifiers are characterized by a hydrophilic lypophilic balance (HLB) factor. It has been found that an optimum range of average HLB values for the present product is from 4.0 to 7.7 and preferably from 4.7 to 7.0.

Outside ranges as low as 3.5 to 9.8 have also been employed. At a low HLB value of say 2.8, the final product tends to undergo physical flow and distortion of piece shape when stored at 85° F. In addition, some of the vegetable oil tends to exude and collect upon the surface of the product. Certain emulsifiers of high HLB value, e.g., above 9.8, may contribute an off-flavor to the final product.

Suitable emulsifiers may include a single one or blends. For example, a triglycerol monostearate sold by Durkee under the name "Santone 3-1-S" and having an HLB value of 7.2 may be employed by itself. Alternatively, it may be employed in combination with a polyglycerol ester hydrate sold by Paniplus Co. under the designation 505, with an HLB value of 5.0. Similarly, a blend of the following three emulsifiers supplied by Atlas Chemical may be employed to provide the desired average HLB values: (1) mono- and diglycerides (Atmul 500, HLB value—3.5); (2) sorbitan monostearate (Span 60, HLB value—4.7); and (3) polysorbate 60 (Tween 60, HLB value —14.9).

Different emulsifiers have different processing properties. Thus, the polyglycerol ester hydrate 505 is a soft paste or thick slurry containing 60% water. This emulsifier may be added directly to the corn syrup charge prior to solution in hot vegetable oil. In contrast, the Durkee triglycerol monostearate emulsifier requires a solution in hot vegetable oil.

Another important characteristic of the product is its taffy-like consistency or stretchiness. It is believed that one of the ingredients which imparts this characteristic is a starch or a starch mixture. A suitable starch mixture includes a pregelatinized tapioca starch (Binasol-15 sold by A. E. Staley) together with a modified corn starch (National 78-1724 or Dura-Jel). Another product which has been used successfully to impart a stretchy or taffy-like characteristic to the product is wheat flour (All-Purpose). However, such wheat flour may contribute to an off-color or browning if processing conditions are not carefully controlled.

A certain amount of water is added to the above formulation during processing. It has been found that the addition of at least about 4 to 5% of water provides a good smoothness to the product during processing. At water levels substantially below this, a chalky character may be imparted to the product. It is believed that this is caused by incomplete hydration of the starch. During the processing, most of the water added during this step is evaporated from the product to form a final product at a moisture content of about 5-10%. A preferred formulation which has been found to produce a desirable product is set forth below in Table 2.

Table 2

Preferred Formulation

| Components | Approximate Percentage by Weight |
|---|---|
| Corn syrup, 43° Be, 43° DE (Regular type or high maltose, dual conversion type) | 32 - 58 |
| Sorbitol solution, 70% ss | 8 - 10 |
| Glycerin, USP, 96% | 1.3 - 3.0 |
| Apple Juice Concentrate, 75% ss (or other fruits) | 4 - 6 |
| Dehydrated Apple, ⅛" ground (or other fruits) | 4 - 6 |
| Emulsifier Blend (3-1-S Polyglycerol Ester Hydrate (HLB - 5.0) and 3-1-S Triglycerol Monostearate (HLB 7.2) | 0.5 - 3 |
| Vegetable oil, partially hydrogenated | 1.0 - 7.0 |
| Pregelatinized tapioca starch | 0 - 6.6 |
| Waxy Maize Foodstarch Modified (not pregelatinized) | 0 - 6.4 |
| Wheat Flour (All Purpose) | 0 - 4 |
| Tapioca Dextrin | 4 - 18 |
| Sugar, sucrose | 7 - 14 |
| Citric acids | 0.5 - 1.0 |
| Food grade organic acid salts (sodium citrate) | 0.2 - 0.4 |
| Natural or imitation flavor and coloring | As needed |
| Water (in mixing step) | 4 - 6 |

Processing

The formulations designated A, B, and C in Table 3 have been found to provide excellent candy products in accordance with the present invention. Formulations A and C have superior chewy fruit character due to the presence of tapioca dextrin. However, this is a relatively expensive ingredient.

The method of forming the above products includes thorough mixing and cooking at selected temperature. In general, the preferred mixing procedure is as follows:

(1) Mix heavy wet items (e.g., corn syrup, dried fruit, juice concentrate, sorbitol and glycerin);

(2) Mix minor wet ingredients together in water (e.g., sodium citrate, maltol and color) and add to the main mixture;

(3) Mix fat phase (emulsifier and oil) with heating if necessary and add to main mixture;

(4) Mix dry items (e.g., sucrose, anhydrous citric acid, tapioca dextrin and all-purpose flour) and blend into main mix;

(5) Cook mix with constant stirring;

(6) Add flavoring and mix; and (7) Cool to form bars and package.

Table 3

| Ingredient | Parts by Weight | | |
|---|---|---|---|
| | A | B | C |
| High Maltose Corn Syrup, 43° Be, DE42 | 37.28 | 0 | 0 |
| Regular Corn Syrup, 43° Be, DE43 | 0 | 51.78 | 37.71 |
| Sorbitol Solution, 70% ss | 9.26 | 9.4 | 9.37 |
| Glycerin, USP, 96% | 1.81 | 3.0 | 1.83 |
| Apple Juice Concentrate 75% ss | 4.63 | 4.69 | 5.4 |
| Evaporated Apples, ⅛ inch dice | 5.33 | 5.4 | 5.4 |
| Color | 0.05 | 0.05 | 0.01 |
| Water | 5.07 | 3.87 | 1.02 |
| 3-1-S Polyglycerol Ester Hydrate #505 | 0 | 0 | 2.0 |
| 3-1-S-Triglycerol Monostearate (Durkee) | 0 | 1.0 | 0 |
| Mono- and Diglycerides, Durem 207 | 0.81 | 0 | 0 |
| Vegetable Oil (Low M.P.), Durkex 500 | 6.9 | 0 | 7.01 |
| Vegetable Oil (High M.P.), Kaomel (Durkee) | 0 | 5.2 | 0 |
| Modified Tapioca Starch, Binasol-15 (Pregelatinized) | 0 | 2.8 | 2.4 |
| Foodstarch Modified, Dura-Jel (Not pregelatinized) | 0 | 4.0 | 3.6 |
| All-Purpose Flour | 3.72 | 0 | 0 |
| Citric Acid, anhydrous | 0.80 | 0.8 | 0.81 |
| Sodium Citrate, hydrate | 0.20 | 0.20 | 0.20 |
| Sugar, sucrose, granular | 6.92 | 7.6 | 14.0 |
| Tapioca dextrin, Crystal Gum (Natl. Starch & Chem. Co.) | 17.06 | 0 | 10.42 |
| Natural and/or Imitation Flavors | 0.20 | 0.31 | 0.03 |
| TOTAL | 100.0 | 100.1 | 101.21 |

A further disclosure of the nature of the present invention is provided by the following specific examples of the practice of the invention. It should be understood that the data disclosed serve only as examples and are not intended to limit the scope of the invention.

EXAMPLE 1

APPLE-CINNAMON FLAVORED PRODUCT

| Ingredients | LBS/BATCH OF 400 LBS. |
|---|---|
| Group 1 | |
| Dried apples, ground ⅛ inch | 21.60 lbs. |
| Apple juice concentrate 75° Brix | 18.76 lbs. |
| 70% Sorbitol solution | 37.48 lbs. |
| Corn syrup, 34% maltose | 150.84 lbs. |
| 96% Glycerine solution | 7.32 lbs. |
| Group 2 | |
| Water | 15.48 lbs. |
| Sodium Citrate | 0.8 lbs. |
| Caramel color | 0.2 lbs. |
| Group 3 | |
| Vegetable oil (Durkex 500) | 28.04 lbs. |
| Emulsifier | 3.28 lbs. |
| Group 4 | |
| Sucrose | 28.00 lbs. |
| Citric acid, anhydrous | 3.24 lbs. |
| Tapioca dextrin (Crystal gum) | 69.04 lbs. |
| Flour, All-Purpose | 15.08 lbs. |
| Bakers special cinnamon | 0.84 lbs. |
| TOTAL | 400.00 lbs. |

PREPARATION PROCEDURE

1. Weigh out Group 1 ingredients and mix well.

2. Dissolve all of the Group 2 ingredients together, add to Group 1 mixture, and mix well.

3. Heat Group 3 ingredients to melt (melt at 150° F.) and add to the above mixture and mix until creamy.

4. Combine Group 4 ingredients, premix, add the above mixture, and mix well until thick and creamy.

5. Cook the mixture to approximately 242° F. with a constant stirring.

6. Cool the mixture, and extrude and/or roll to size and cut to form bars.

7. Package the bars in a transparent polymer film and heat seal.

EXAMPLE 2

GRAPE FLAVORED PRODUCT

The procedure of Example 1 was followed to form a grape flavored product. Substituted for the apple juice concentrate was grape (Concord) concentrate 68° Brix (29.16 lbs.). A combination of grape and red colors were used instead of the caramel color. The only other major change was the use of a grape flavor mix (0.6 lbs.) in place of the cinnamon flavor.

EXAMPLE 3

CHERRY FLAVORED PRODUCT

The procedure of Example 1 was followed to form a cherry flavored product. Red color only was used with a cherry flavor mix instead of the caramel color and cinnamon mix.

EXAMPLE 4

STRAWBERRY FLAVORED PRODUCT

A strawberry flavor product was formed in accordance with claim 1. Strawberry puree (18.08 lbs.) was added and a different flavor mix was used.

What is claimed is:

1. A candy product comprising a colored translucent substrate with opaque dehydrated fruit particles randomly distributed throughout the same, said candy product having a natural fruit taste, a taffy-like consistency and sufficient slipperiness to avoid sticking to the teeth on chewing, said candy product comprising about 30 to 60 weight % corn syrup, at least 5 weight % dextrin binder, about 2 to 25 weight % opaque dehydrated fruit, at least 1% vegetable oil, about 2.5 to 13 weight % of a combination of 6-hydroxy alcohol and glycerin, and an emulsifying agent.

2. The candy product of claim 1 in which said emulsifying agent has an average hydrophilic-lipophilic balance of at least 4.0.

3. The candy product of claim 1 together with wheat flour.

4. The candy product of claim 1 together with modified waxy maize corn starch and pregelatinized starch.

5. The candy product of claim 1 in which said dextrin as of the tapioca type.

6. The candy product of claim 1 together with the solids content of a fruit juice dispersed throughout said substrate.

7. The candy product of claim 1 in which said 6-hydroxy alcohol is sorbitol.

8. The candy product of claim 1 including at least 2 weight % of said 6-hydroxy alcohol.

9. The candy product of claim 1 including at least 0.5 weight % of said glycerin.

10. The candy product of claim 1 including from about 5 to 20 weight % dextrin binder.

11. The candy product of claim 1 including from about 1 to 10 weight % vegetable oil.

* * * * *